United States Patent
Choi et al.

(10) Patent No.: US 11,258,063 B2
(45) Date of Patent: Feb. 22, 2022

(54) METHOD FOR PREPARING POSITIVE ELECTRODE ACTIVE MATERIAL

(71) Applicant: LG Chem, Ltd., Seoul (KR)

(72) Inventors: Sang Soon Choi, Daejeon (KR); Seung Beom Cho, Daejeon (KR); Hyun Ah Park, Daejeon (KR); Won Sig Jung, Daejeon (KR)

(73) Assignee: LG Chem, Ltd.

( * ) Notice: Subject to any disclaimer, the term of this patent is extended or adjusted under 35 U.S.C. 154(b) by 152 days.

(21) Appl. No.: 16/628,111

(22) PCT Filed: Jul. 13, 2018

(86) PCT No.: PCT/KR2018/007962
§ 371 (c)(1),
(2) Date: Jan. 2, 2020

(87) PCT Pub. No.: WO2019/013587
PCT Pub. Date: Jan. 17, 2019

(65) Prior Publication Data
US 2021/0036317 A1    Feb. 4, 2021

(30) Foreign Application Priority Data
Jul. 13, 2017    (KR) .................. 10-2017-0089262

(51) Int. Cl.
*H01M 4/525* (2010.01)
*C01G 53/00* (2006.01)
(Continued)

(52) U.S. Cl.
CPC ............ *H01M 4/525* (2013.01); *C01G 53/50* (2013.01); *H01M 4/505* (2013.01);
(Continued)

(58) Field of Classification Search
CPC .................................................... H01M 4/525
See application file for complete search history.

(56) References Cited

U.S. PATENT DOCUMENTS

| | | |
|---|---|---|
| 2011/0171529 A1 | 7/2011 | Kono et al. |
| 2011/0291042 A1 | 12/2011 | Li et al. |

(Continued)

FOREIGN PATENT DOCUMENTS

| | | |
|---|---|---|
| CN | 1870331 A | 11/2006 |
| CN | 101355159 A | 1/2009 |

(Continued)

OTHER PUBLICATIONS

Eguchi et al., English machine translation of JP 2016091626 A (Year: 2016).*

(Continued)

*Primary Examiner* — Peter F Godenschwager
(74) *Attorney, Agent, or Firm* — Lerner, David, Littenberg, Krumholz & Mentlik, LLP

(57) ABSTRACT

A method of preparing a positive electrode active material which includes forming a pre-sintered mixture by adding a reaction mixture including a lithium raw material and a nickel-manganese-cobalt precursor to a first crucible and performing a primary heat treatment at a temperature of 500° C. to 800° C., and, after discharging the pre-sintered mixture from the first crucible, adding the pre-sintered mixture to a second crucible and performing a secondary heat treatment at a temperature of 700° C. to 1,000° C. to form a lithium nickel manganese cobalt-based positive electrode active material, wherein a volume of the pre-sintered mixture formed after the primary heat treatment is 20% to 50% of a volume of the reaction mixture added to the first crucible.

13 Claims, 2 Drawing Sheets

(51) Int. Cl.
*H01M 4/505* (2010.01)
*H01M 10/0525* (2010.01)
*H01M 4/02* (2006.01)

(52) U.S. Cl.
CPC ..... *H01M 10/0525* (2013.01); *C01P 2002/52* (2013.01); *C01P 2006/40* (2013.01); *H01M 2004/028* (2013.01)

(56) References Cited

U.S. PATENT DOCUMENTS

| | | |
|---|---|---|
| 2012/0040247 A1 | 2/2012 | Manivannan et al. |
| 2012/0248388 A1 | 10/2012 | Nagai et al. |
| 2015/0380720 A1 | 12/2015 | Kim et al. |
| 2016/0156020 A1 | 6/2016 | Tokoro et al. |
| 2016/0190582 A1 | 6/2016 | Son et al. |
| 2017/0077490 A1 | 3/2017 | Zhang et al. |
| 2017/0288215 A1 | 10/2017 | Mitsumoto et al. |

FOREIGN PATENT DOCUMENTS

| | | |
|---|---|---|
| CN | 101478044 A | 7/2009 |
| CN | 103840148 A | 6/2014 |
| CN | 104766968 A | 7/2015 |
| CN | 104993121 A | 10/2015 |
| CN | 106299254 A | 1/2017 |
| JP | 2001192210 A | 7/2001 |
| JP | 2005025975 A | 1/2005 |
| JP | 2011187174 A | 9/2011 |
| JP | 5007919 B2 | 8/2012 |
| JP | 5153189 B2 | 2/2013 |
| JP | 2016017017 A | 2/2016 |
| JP | 2016509348 A | 3/2016 |
| JP | 2016081716 A | 5/2016 |
| JP | 2016091626 A | 5/2016 |
| JP | 5997087 B2 | 9/2016 |
| JP | 2017091821 A | 5/2017 |
| KR | 20050083869 A | 8/2005 |
| KR | 101134566 B1 | 4/2012 |
| KR | 20140101915 A | 8/2014 |
| KR | 101438984 B1 | 9/2014 |
| KR | 20160063982 A | 6/2016 |
| KR | 20160078031 A | 7/2016 |
| KR | 20170048244 A | 5/2017 |
| WO | 2010116839 A1 | 10/2010 |
| WO | 2016035852 A1 | 3/2016 |

OTHER PUBLICATIONS

Search report from International Application No. PCT/KR2018/007962, dated Oct. 31, 2018.
Chinese Search Report for Application No. 201880044281.7, dated Sep. 9, 2021, 3 pages.

\* cited by examiner

METHOD FOR PREPARING POSITIVE ELECTRODE ACTIVE MATERIAL

CROSS-REFERENCE TO RELATED APPLICATIONS

The present application is a national phase entry under 35 U.S.C. § 371 of International Application No. PCT/KR2018/007962 filed Jul. 13, 2018, which claims priority from Korean Patent Application No. 10-2017-0089262, filed on Jul. 13, 2017, all of which are incorporated herein by reference.

TECHNICAL FIELD

The present invention relates to a method of preparing a positive electrode active material, and more particularly, to a method of preparing a lithium nickel manganese cobalt oxide-based positive electrode active material having excellent productivity, quality uniformity, and physical properties.

BACKGROUND ART

Demand for secondary batteries as an energy source has been significantly increased as technology development and demand with respect to mobile devices have increased. Among these secondary batteries, lithium secondary batteries having high energy density, high voltage, long cycle life, and low self-discharging rate have been commercialized and widely used.

Various lithium transition metal oxides, such as $LiCoO_2$, $LiNiO_2$, $LiMnO_2$, $LiMn_2O_4$, $LiFePO_4$, and $Li(Ni_aCo_bMn_c)O_2$ (where a, b, c are each independently atomic fractions of oxide constituent elements, wherein 0<a<1, 0<b<1, 0<c<1, and a+b+c=1), have been developed as a positive electrode active material for a lithium secondary battery. Among these oxides, $Li(Ni_aCo_bMn_c)O_2$ has recently been actively studied because $Li(Ni_aCo_bMn_c)O_2$ is advantageous in that it may be used for high capacity and high voltage.

A conventional lithium nickel manganese cobalt-based oxide has been prepared by a method in which, after a precursor, such as a nickel-manganese-cobalt hydroxide, and a lithium raw material, such as lithium hydroxide or lithium carbonate, are mixed, the mixture is added to a crucible and calcinated at a high temperature of about 750° C. to about 950° C.

However, with respect to such a conventional method, since a volume is increased while the nickel-manganese-cobalt precursor and the lithium raw material are mixed, amounts of raw materials, which may be added to the crucible, are reduced and, as a result, productivity may be reduced. If an amount of each raw material subdivided, which is added to the crucible, is increased to increase the productivity, calcinating does not uniformly occur, and thus, quality deviation of positive electrode active materials formed in the same crucible largely occurs after the calcinating. Also, there is a limitation in that unnecessary gas, such as $CO_2$, is generated during the calcinating process to adversely affect the quality of the positive electrode active material.

Thus, there is a need to develop a method of preparing a lithium nickel manganese cobalt-based positive electrode active material having excellent productivity and uniform and good quality.

PRIOR ART DOCUMENT (Patent Document 1) Korean Patent Application Laid-open Publication No. 2005-0083869 (published 2005 Aug. 26)

DISCLOSURE OF THE INVENTION

Technical Problem

An aspect of the present invention provides a method of preparing a lithium nickel manganese cobalt-based positive electrode active material having excellent productivity, because it is possible to obtain a larger amount of the positive electrode active material than a conventional method in a crucible with the same volume, and having uniform and good quality.

Technical Solution

According to an aspect of the present invention, there is provided a method of preparing a positive electrode active material which includes: forming a pre-calcinated mixture by adding a reaction mixture including a lithium raw material and a nickel-manganese-cobalt precursor to a first crucible and performing a primary heat treatment at a temperature of 500° C. to 800° C.; and, after discharging the pre-calcinated mixture from the first crucible, adding the pre-calcinated mixture to a second crucible and performing a secondary heat treatment at a temperature of 700° C. to 1,000° C. to form a lithium nickel manganese cobalt-based positive electrode active material, wherein a volume of the pre-calcinated mixture formed after the primary heat treatment is 20% to 50% of a volume of the reaction mixture added to the first crucible.

In this case, the lithium raw material may include at least one selected from the group consisting of a lithium hydroxide and a lithium carbonate, and the nickel-manganese-cobalt precursor may include at least one selected from the group consisting of a nickel manganese cobalt hydroxide, a nickel manganese cobalt oxyhydroxide, a nickel manganese cobalt carbonate, and a nickel manganese cobalt organic complex.

Also, the reaction mixture may further include a doping raw material, and the doping raw material may include oxides, hydroxides, sulfides, oxyhydroxides, or halides, which include at least one element selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo, or a mixture thereof.

An amount of the pre-calcinated mixture added to the second crucible may be 2 to 10 times an amount of the pre-calcinated mixture formed in the first crucible.

The first crucible may be a crucible formed of a material that may be used at a temperature of 800° C. or less and, for example, may be a stainless steel crucible, a nickel crucible, or an alloy crucible, and the second crucible may be an aluminum crucible.

In the present invention, the primary heat treatment may be performed for 1 hour or more, and the secondary heat treatment may be performed for 2 hours or more. Also, at least one of the primary heat treatment and the secondary heat treatment may be performed in an air atmosphere.

Furthermore, the preparation method of the present invention may further include adding a doping raw material to the second crucible before the secondary heat treatment and/or milling or classifying the pre-calcinated mixture before the pre-calcinated mixture is added to the second crucible.

The lithium nickel manganese cobalt-based positive electrode active material prepared by the preparation method of the present invention may be represented by Formula 1 below.

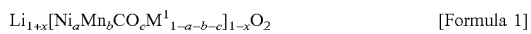
[Formula 1]

In Formula 1, $-0.2 \leq x \leq 0.2$, $0<a<1$, $0<b<1$, and $0<c<1$, and $M^1$ includes at least one selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo.

Advantageous Effects

Since a preparation method of the present invention may form a pre-calcinated mixture having a reduced volume compared to a reaction mixture by performing a primary heat treatment on the reaction mixture at a temperature of 500° C. to 800° C., a relatively larger amount of the pre-calcinated mixture may be contained in a crucible for a secondary heat treatment, and thus, productivity is excellent. Specifically, according to the preparation method of the present invention, a yield 2 to 6 times higher than that of a conventional method using single calcinating may be obtained in a crucible with the same volume.

Also, according to the preparation method of the present invention, since unnecessary gas, such as $CO_2$, or moisture is released during a primary heat treatment process and a secondary heat treatment is performed in a state in which these by-products are removed, there is no degradation of calcinating atmosphere due to gas release during the secondary calcinating and, as a result, an oxygen concentration in a calcinating furnace is relatively highly maintained. Thus, it is advantageous in preparing a positive electrode active material having excellent life characteristics.

Furthermore, according to the preparation method of the present invention, non-uniformity in the quality of the positive electrode active material depending on a position in the crucible may be effectively eliminated.

MODE FOR CARRYING OUT THE INVENTION

Figure 1:
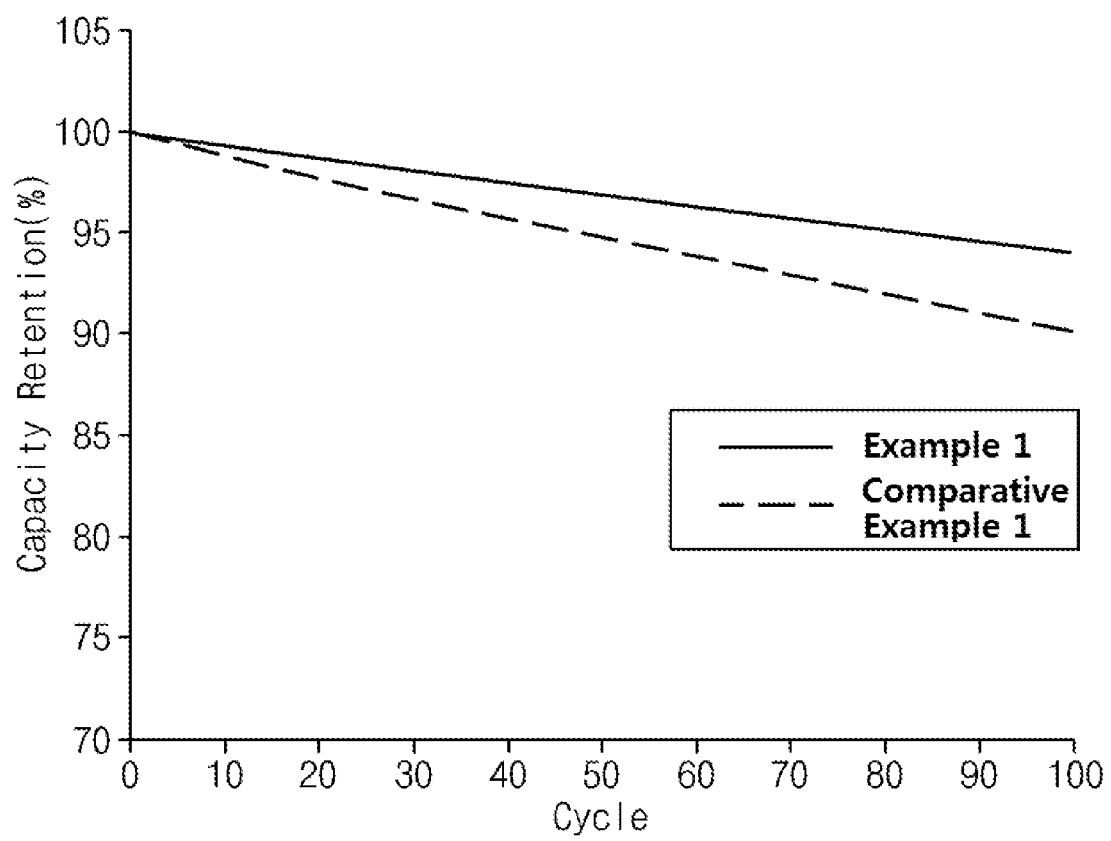
FIG. 1 is a graph showing capacity retentions according to the number of cycles of batteries prepared by using positive electrode active materials of Example 1 and Comparative Example 1.

Hereinafter, the present invention will be described in more detail.

As a result of a significant amount of research conducted into preparing a lithium nickel manganese cobalt-based positive electrode active material having high productivity and uniform quality, the present inventors recognized that the above object may be achieved by forming a pre-calcinated mixture having a reduced volume through pre-calcinating at a specific temperature and performing secondary calcinating of the pre-calcinated mixture, thereby leading to the completion of the present invention.

Specifically, a method of preparing a positive electrode active material according to the present invention includes the steps of: (1) forming a pre-calcinated mixture by adding a reaction mixture including a lithium raw material and a nickel-manganese-cobalt precursor to a first crucible and performing a primary heat treatment at a temperature of 500° C. to 800° C., and (2) after discharging the pre-calcinated mixture from the first crucible, adding the pre-calcinated mixture to a second crucible and performing a secondary heat treatment at a temperature of 700° C. to 1,000° C. to form a lithium nickel manganese cobalt-based positive electrode active material. In this case, a volume of the pre-calcinated mixture formed after the primary heat treatment is about 20% to about 50% of a volume of the reaction mixture added to the first crucible.

Hereinafter, each step of the preparation method according to the present invention will be described in more detail.

(1) Pre-Calcinated Mixture Forming Step

First, a reaction mixture including a lithium raw material and a nickel-manganese-cobalt precursor is added to a first crucible.

As the lithium raw material, various lithium raw materials known in the art may be used without limitation, and, for example, a lithium-containing carbonate (e.g., lithium carbonate, etc.), a lithium-containing hydrate (e.g., lithium hydroxide I hydrate (LiOH.H$_2$O), etc.), a lithium-containing hydroxide (e.g., lithium hydroxide, etc.), a lithium-containing nitrate (e.g., lithium nitrate (LiNO$_3$), etc.), or a lithium-containing chloride (e.g., lithium chloride (LiCl), etc.) may be used. Preferably, at least one selected from the group consisting of a lithium hydroxide and a lithium carbonate may be used as the lithium raw material.

As the nickel-manganese-cobalt precursor, various nickel manganese cobalt precursor materials known in the art may be used without limitation, and, for example, at least one selected from the group consisting of a nickel manganese cobalt hydroxide, a nickel manganese cobalt oxyhydroxide, a nickel manganese cobalt carbonate, and a nickel manganese cobalt organic complex may be used.

The nickel-manganese-cobalt precursor may be used by purchasing a commercially available product or may be prepared according to a method of preparing a nickel-manganese-cobalt transition metal precursor which is well known in the art.

For example, the nickel-manganese-cobalt transition metal precursor may be prepared by a co-precipitation reaction by adding an ammonium cation-containing complexing agent and a basic compound to a metal solution including a nickel-containing raw material, a cobalt-containing raw material, and a manganese-containing raw material.

The nickel-containing raw material, for example, may include nickel-containing acetic acid salts, nitrates, sulfates, halides, sulfides, hydroxides, oxides, or oxyhydroxides, and may specifically include Ni(OH)$_2$, NiO, NiOOH, NiCO$_3$.2Ni(OH)$_2$.4H$_2$O, NiC$_2$O$_2$.2H$_2$O, Ni(NO$_3$)$_2$.6H$_2$O, NiSO$_4$, NiSO$_4$.6H$_2$O, a fatty acid nickel salt, a nickel halide, or a combination thereof, but the present invention is not limited thereto.

The cobalt-containing raw material may include cobalt-containing acetic acid salts, nitrates, sulfates, halides, sulfides, hydroxides, oxides, or oxyhydroxides, and may specifically include as Co(OH)$_2$, CoOOH, Co(OCOCH$_3$)$_2$.4H$_2$O, Co(NO$_3$)$_2$.6H$_2$O, Co(SO$_4$)$_2$.7H$_2$O, or a combination thereof, but the present invention is not limited thereto.

The manganese-containing raw material, for example, may include manganese-containing acetic acid salts, nitrates, sulfates, halides, sulfides, hydroxides, oxides, oxyhydroxides, or a combination thereof, and may specifically include a manganese oxide such as $Mn_2O_3$, $MnO_2$, and $Mn_3O_4$; a manganese salt such as $MnCO_3$, $Mn(NO_3)_2$, $MnSO_4$, manganese acetate, manganese dicarboxylate, manganese citrate, and a fatty acid manganese salt; a manganese oxyhydroxide, manganese chloride, or a combination thereof, but the present invention is not limited thereto.

The metal solution may be prepared by adding the nickel-containing raw material, the cobalt-containing raw material, and the manganese-containing raw material to a solvent, specifically water, or a mixture of water and an organic solvent (e.g., alcohol, etc.) which may be uniformly mixed with the water, or may be prepared by mixing an aqueous solution of the nickel-containing raw material, an aqueous solution of the cobalt-containing raw material, and an aqueous solution of the manganese-containing raw material.

The ammonium cation-containing complexing agent, for example, may include $NH_4OH$, $(NH_4)_2SO_4$, $NH_4NO_3$, $NH_4Cl$, $CH_3COONH_4$, $NH_4CO_3$, or a combination thereof, but the present invention is not limited thereto. The ammonium cation-containing complexing agent may be used in the form of an aqueous solution, and, in this case, water or a mixture of water and an organic solvent (specifically, alcohol, etc.), which may be uniformly mixed with the water, may be used as a solvent.

The basic compound may include a hydroxide of alkali metal or alkaline earth metal, such as NaOH, KOH, or $Ca(OH)_2$, a hydrate thereof, or a combination thereof. The basic compound may also be used in the form of an aqueous solution, and, in this case, water or a mixture of water and an organic solvent (specifically, alcohol, etc.), which may be uniformly mixed with the water, may be used as a solvent.

The basic compound is added to adjust a pH of the reaction solution, wherein the basic compound may be added in an amount such that the pH of the metal solution is 10.5 to 13, for example, 11 to 13.

The co-precipitation reaction may be performed in a temperature range of 40° C. to 70° C. in an inert atmosphere such as nitrogen or argon.

Particles of nickel-manganese-cobalt hydroxide are formed by the above-described process and are precipitated in the reaction solution. A transition metal precursor may be obtained by separating and drying the precipitated nickel-manganese-cobalt hydroxide particles according to a conventional method.

Amounts of the lithium raw material and the nickel-manganese-cobalt precursor in the reaction mixture may be appropriately adjusted in consideration of a composition of the positive electrode active material to be finally obtained. For example, the lithium raw material and the nickel-manganese-cobalt precursor may be included in the reaction mixture so that an atomic ratio of lithium to transition metal is in a range of 1:1.01 to 1:1.09. Herein, the atomic ratio of the transition metal denotes the total number of transition metal atoms in which the number of nickel atoms, the number of cobalt atoms, and the number of manganese atoms are added.

The reaction mixture may further include a doping raw material for improving stability and physical properties of the positive electrode active material in addition to the lithium raw material and the nickel-manganese-cobalt precursor. Oxides, hydroxides, sulfides, oxyhydroxides, or halides, which include at least one element selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo, or a mixture thereof may be used as the doping raw material.

The reaction mixture including the above-described components may be prepared by solid-phase mixing by adding each component to a mixer, but the present invention is not limited thereto.

After the addition of the reaction mixture to the first crucible, a primary heat treatment is performed at a temperature of 500° C. to 800° C., for example, 550° C. to 700° C. If the primary heat treatment is performed within the above temperature range, the lithium raw material having low density is adhered to the nickel-manganese-cobalt precursor while being melted, and thus, a pre-calcinated mixture having a reduced volume compared to the reaction mixture is formed. Specifically, a volume of the pre-calcinated mixture formed by the primary heat treatment within the above temperature range is 20% to 50%, for example, 20% to 40% of a volume of the reaction mixture added to the first crucible. If the primary heat treatment temperature is less than 500° C., since there is almost no structural change of the nickel-manganese-cobalt precursor, as a raw material, even after the primary heat treatment and the pre-calcinated mixture is formed in the form in which lithium is non-uniformly adhered to a surface thereof, a volume reduction effect is insignificant. Thus, in a case in which the primary heat treatment temperature is less than 500° C., a productivity improvement effect is reduced, and quality uniformity of the finally produced positive electrode active material is also reduced. If the primary heat treatment temperature is greater than 800° C., it is disadvantageous in that it is difficult to control crystal growth and characteristics of the positive electrode material, as a final product, due to rapid crystal growth during the primary heat treatment.

The primary heat treatment may be performed for 1 hour or more, preferably 3 hours or more, and more preferably 3 hours to 12 hours. In a case in which the primary heat treatment time is 1 hour or more, it is possible to sufficiently remove moisture and gas generated during the heat treatment, and it is advantageous in that it is easy to control crystal growth during the secondary heat treatment.

Also, the primary heat treatment may be performed in an oxygen atmosphere or an air atmosphere, and it is more preferable to perform the primary heat treatment in an air atmosphere in terms of economic efficiency.

A crucible commonly used in the art, such as a stainless steel crucible, a nickel crucible, an alloy crucible (e.g., Inconel, Hastelloy, etc.), and an aluminum crucible, may be used as the first crucible. Among them, it is desirable to use the stainless steel crucible, the nickel crucible, or the alloy crucible in terms of economic efficiency. With respect to the aluminum crucible, since it is easily damaged by the lithium raw material, it is difficult to use the aluminum crucible for a long period of time. In contrast, it is advantageous in that the stainless steel crucible, the nickel crucible, or the alloy crucible has higher durability than the aluminum crucible, but these crucibles are not suitable for high-temperature calcinating performed at a temperature greater than 800° C. Thus, typically, an aluminum crucible has mainly been used during the preparation of a lithium nickel manganese cobalt-based positive electrode active material. However, since the primary heat treatment temperature is 800° C. or less, the stainless steel crucible, the nickel crucible, or the alloy crucible may be used during the primary heat treatment, and, as a result, the cost of replacing crucibles may be reduced.

Although not essential, after the primary heat treatment, a step of milling or classifying may be further performed, if necessary, after the pre-calcinated mixture is discharged from the first crucible and before the pre-calcinated mixture is added to a second crucible to be described later. In this case, the milling or classification may be performed by a common milling or classification method known in the art, for example, ball milling, jet milling, or sieving. In a case in which the milling or classifying step is performed, tap density of the pre-calcinated mixture may be increased to contain a larger amount of the pre-calcinated mixture in the second crucible, and the pre-calcinated mixture may be homogeneously mixed in the milling or classification process to further improve the quality uniformity of the positive electrode active material.

(2) Lithium Nickel Manganese Cobalt-Based Positive Electrode Active Material Forming Step When the pre-calcinated mixture is formed by the primary heat treatment, the pre-calcinated mixture is discharged from the first crucible. Thereafter, the pre-calcinated mixture is added to the second crucible and a secondary heat treatment is performed at a temperature of 700° C. to 1,000° C., for example, 750° C. to 1,000° C. to form a lithium nickel manganese cobalt-based positive electrode active material.

In this case, an amount of the pre-calcinated mixture added to the second crucible may be 2 to 10 times, for example, 2 to 6 times an amount of the pre-calcinated mixture formed in the first crucible. As described above, since the pre-calcinated mixture has a reduced volume compared to the reaction mixture by the primary heat treatment, a larger amount of the pre-calcinated mixture than that when the reaction mixture is directly added may be added to the second crucible. Thus, since the amount of the pre-calcinated mixture added to the second crucible is maximized, it is possible to obtain a larger amount of the positive electrode active material than a conventional method in the crucible with the same volume.

The secondary heat treatment may be performed for 2 hours or more, preferably 4 hours or more, and more preferably 4 hours to 20 hours. In a case in which the secondary heat treatment is performed less than 2 hours, since the crystal growth does not sufficiently occur, high-temperature lifetime or storage characteristics may be degraded when the positive electrode active material is used in the battery.

Also, the secondary heat treatment may be performed in an oxygen atmosphere or an air atmosphere, and it is more desirable to perform the secondary heat treatment in an air atmosphere in terms of economic efficiency. Gas, such as $CO_2$, is generated during the calcinating of the lithium raw material and the nickel-manganese-cobalt precursor. When unnecessary gas, such as $CO_2$, is generated, an oxygen fraction in a calcinating atmosphere is reduced, and, as a result, physical properties of the positive electrode active material formed may be deteriorated. Thus, typically, it was common to perform calcinating in an oxygen atmosphere to prepare a high-quality positive electrode active material. However, with respect to the present invention, since $CO_2$ gas is already generated during the primary heat treatment, a by-product, such as $CO_2$, is not generated during the secondary heat treatment. Therefore, a high-quality positive electrode active material may be prepared even if the calcinating is performed in an air atmosphere instead of an oxygen atmosphere.

Since the secondary heat treatment is performed at a high temperature, the second crucible may be an aluminum crucible.

Also, in the preparation method of the present invention, although not essential, a doping raw material may be further added to the second crucible before the secondary heat treatment, if necessary, to improve the stability and physical properties of the positive electrode active material. Oxides, hydroxides, sulfides, oxyhydroxides, or halides, which include at least one element selected from the group consisting of W, Cu, Fe, V, Cr, Ti, Zr, Zn, Al, In, Ta, In, Y, La, Sr, Ga, Sc, Gd, Sm, Ca, Ce, Nb, Mg, B, and Mo, or a mixture thereof may be used as the doping raw material.

The lithium nickel manganese cobalt-based positive electrode active material prepared by the above-described preparation method of the present invention may be represented by Formula 1 below.

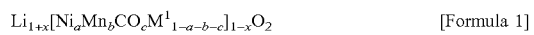

$$Li_{1+x}[Ni_aMn_bCO_cM^1{}_{1-a-b-c}]_{1-x}O_2 \qquad \text{[Formula 1]}$$

In Formula 1, $-0.2 \le x \le 0.2$, $0<a<1$, $0<b<1$, and $0<c<1$, and $M^1$ may include at least one selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo.

a, b, and c respectively represent atomic fractions of Ni, Mn, and Co, wherein, for example, $0.01 \le a \le 0.98$, $0.01 \le b \le 0.98$, and $0.01 \le c \le 0.98$, particularly $0.5 \le a \le 0.98$, $0.01 \le b \le 0.49$, and $0.01 \le c \le 0.49$, and more particularly $0.6 \le a \le 0.98$, $0.01 \le b \le 0.39$, and $0.01 \le c \le 0.39$, although not limited thereto.

Since the preparation method of the present invention may form a pre-calcinated mixture having a reduced volume compared to the reaction mixture by performing the primary heat treatment, a relatively larger amount of the pre-calcinated mixture may be contained in the crucible for a second heat treatment, and thus, productivity is excellent.

Also, since the reaction by-product, such as moisture or $CO_2$, is generated during the primary heat treatment and the secondary heat treatment is performed using the pre-calcinated mixture from which the reaction by-product is removed, degradation of the calcinating atmosphere or degradation of the positive electrode active material characteristics by the reaction by-product is minimized, and thus, an excellent and uniform quality positive electrode active material may be prepared.

Hereinafter, the present invention will be described in more detail according to specific examples.

PREFERRED MODE FOR CARRYING OUT THE INVENTION

Example 1

After LiOH and $Ni_{0.8}Co_{0.1}Mn_{0.1}(OH)_2$ were mixed in a weight ratio of 1.01:1 with a mixer to form a reaction mixture, 7,500 g (volume: 84,000 ml) of the reaction mixture was added to a stainless steel crucible and subjected to a primary heat treatment at 600° C. for 5 hours in an air atmosphere to form a pre-calcinated mixture, and the pre-calcinated mixture was then cooled. A volume of the pre-calcinated mixture prepared was 2,000 ml and a weight of the pre-calcinated mixture was about 5,000 g.

After 10,000 g (volume: 8,000 ml) of the pre-calcinated mixture was pulverized and sieved, the pulverized pre-calcinated mixture was added to an aluminum crucible and subjected to a secondary heat treatment at 800° C. for 10 hours in an air atmosphere to prepare a positive electrode active material.

Example 2

After $Li_2CO_3$ and $Ni_{0.6}Co_{0.2}Mn_{0.2}(OH)_2$ were mixed in a weight ratio of 1.07:1 with a mixer to form a reaction mixture, 7,500 g (volume: 8,000 ml) of the reaction mixture was added to a stainless steel crucible and subjected to a primary heat treatment at 750° C. for 5 hours to form a pre-calcinated mixture, and the pre-calcinated mixture was then cooled. A volume of the pre-calcinated mixture prepared was 2,000 ml and a weight of the pre-calcinated mixture was about 5,000 g.

After 10,000 g (volume: 8,000 ml) of the pre-calcinated mixture was pulverized and sieved, the pulverized pre-calcinated mixture was added to an aluminum crucible and subjected to a secondary heat treatment at 860° C. for 13 hours to prepare a positive electrode active material.

Comparative Example 1

After LiOH and $Ni_{0.8}Co_{0.1}Mn_{0.1}(OH)_2$ were mixed in a weight ratio of 1.03:1 with a mixer to form a reaction mixture, 4,500 g (volume: 4,000 ml) of the reaction mixture was added to an aluminum crucible and subjected to a heat treatment at 780° C. for 15 hours in an oxygen atmosphere to form a positive electrode active material.

Comparative Example 2

After $Li_2CO_3$ and $Ni_{0.6}Co_{0.2}Mn_{0.2}(OH)_2$ were mixed in a weight ratio of 1.07:1 with a mixer to form a reaction mixture, 4,500 g (volume: 4,000 ml) of the reaction mixture was added to an aluminum crucible and subjected to a heat treatment at 860° C. for 15 hours in an oxygen atmosphere to form a positive electrode active material.

Comparative Example 3

A positive electrode active material was prepared in the same manner as in Example 1 except that the primary heat treatment temperature was set to 400° C. A volume of the pre-calcinated mixture prepared after the primary heat treatment was 7,500 ml, wherein a decrease in the volume almost did not occur. Also, a weight of the pre-calcinated mixture was measured to be about 6,700 g. That a weight reduction rate of the pre-calcinated mixture of Comparative Example 3 was smaller than those of Examples 1 and 2 was considered due to the fact that moisture and gas removal rates were low due to the low primary heat treatment temperature.

Experimental Example 1: Quality Uniformity Evaluation of Positive Electrode Active Material 10 g of the positive electrode active material was collected from 8 locations including upper and lower portions of each corner of the aluminum crucibles used in Example 1 and Comparative Example 1. For convenience, the four corners of the crucible are denoted by 1, 2, 3, and 4, one collected from the upper portion is denoted as "top", and one collected from the lower portion is denoted as "bottom". That is, the expression "1 top" denotes a positive electrode active material sample collected from the upper portion of the corner 1, and the expression "1 bottom" denotes a positive electrode active material sample collected from the lower portion of the corner 1.

After each of the collected positive electrode active materials was dispersed in 100 mL of water, a change in PH value was measured while being titrated with 0.1 M HCl to obtain a pH titration curve, and a residual amount of a lithium by-product in each positive electrode active material was evaluated by using the pH titration curve. The evaluation results are presented in Table 1.

Also, 8 positive electrodes were prepared by using the positive electrode active material collected from each location of the crucible. Specifically, after a slurry was prepared by dispersing 96.5 parts by weight of the positive electrode active material, 2.0 parts by weight of a PVdF binder, and 1.5 parts by weight of carbon black, as a conductive agent, in a N-methyl-2-pyrrolidone (NMP) solution, each positive electrode was prepared by coating an aluminum (Al) current collector with the slurry and then roll-pressing the coated Al current collector.

The positive electrode thus prepared, lithium metal, as a counter electrode, EC/EMC/DEC (20/70/10, volume ratio), and an electrolyte solution composed of 1M $LiPF_6$ were used to prepare a coin cell.

After a charge/discharge test was performed two times on the above-prepared coin cell in a voltage range of 4.25 V to 2.5 V based on 0.2 C, discharge capacity (unit: mAhg) in the first charge/discharge cycle was measured, and the measurement results are presented in Table 1 below.

TABLE 1

| | | 1 top | 2 top | 3 top | 4 top | 1 bottom | 2 bottom | 3 bottom | 4 bottom | Standard deviation | average |
|---|---|---|---|---|---|---|---|---|---|---|---|
| Example 1 | Capacity (mAhg) | 199.7 | 198.9 | 199.2 | 199.9 | 200.1 | 199.8 | 199.8 | 199.7 | 0.392 | 199.64 |
| | Lithium by-product amount (%) | 1.09 | 1.17 | 1.11 | 1.08 | 1.15 | 1.12 | 1.10 | 1.15 | 0.0323 | 1.12 |
| Comparative Example 1 | Capacity (mAhg) | 199.9 | 198.5 | 198.5 | 200.4 | 198.2 | 199.1 | 199.8 | 201.2 | 1.054 | 199.58 |
| | Lithium by-product amount (%) | 1.11 | 1.09 | 1.18 | 1.16 | 1.29 | 1.25 | 1.3 | 1.28 | 0.0835 | 1.21 |

As illustrated in Table 1, it may be confirmed that the positive electrode active material of Example 1 prepared according to the method of the present invention exhibited relatively uniform physical properties regardless of the collected location, but, with respect to the positive electrode active material of Comparative Example 1, since deviation of physical properties was large depending on the collected position, quality was not uniform.

Experimental Example 2: Life Characteristics and Resistance Increase Rate Evaluation After each of the positive electrode active materials prepared in Examples 1 and 2 and Comparative Examples 1 and 2, a PVdF binder, and carbon black were dispersed in an NMP solution at a weight ratio of 97.5:1.5:1.0 to prepare a slurry, an Al current collector was coated with the slurry and then roll-pressed to prepare a positive electrode.

Also, natural graphite, as a negative electrode active material, a carbon black conductive agent, and a PVdF binder were mixed in an N-methylpyrrolidone solvent in a weight ratio of 95.6:1.0:3.4 to prepare a composition for forming a negative electrode, and a copper current collector was coated with the composition to prepare a negative electrode.

An electrode assembly was prepared by disposing a porous polyethylene separator between the positive electrode and the negative electrode prepared as described above, and each lithium secondary battery was prepared by disposing the electrode assembly in a case, and then injecting an electrolyte solution into the case. In this case, the electrolyte solution was prepared by dissolving 0.7 M lithium hexafluorophosphate (LiPF$_6$) in an organic solvent composed of ethylene carbonate/ethylmethyl carbonate (mixing volume ratio of EC:EMC=3:7).

Capacity retentions [%] and resistance increase rates [%] after 100 cycles were measured for the above-prepared lithium secondary batteries while being charged and discharged under conditions including a charge end voltage of 4.2 V, a discharge end voltage of 2.5 V, and 0.3 C/0.3 C at 45° C., and the measurement results are presented in Table 2.

Figure 2:
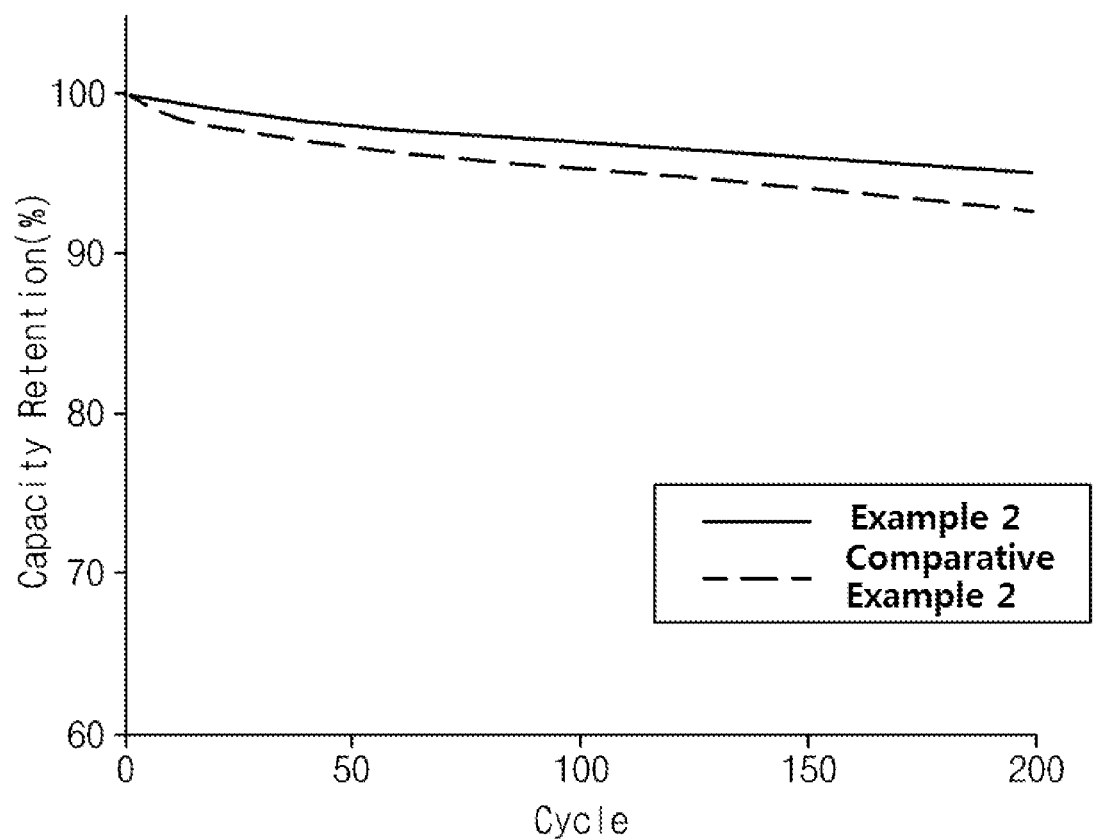
FIG. 2 is a graph showing capacity retentions according to the number of cycles of batteries prepared by using positive electrode active materials of Example 2 and Comparative Example 2.

Also, a graph showing capacity retentions according to the number of cycles of the batteries prepared by using the positive electrode active materials of Example 1 and Comparative Example 1 is illustrated in FIG. 1, and a graph showing capacity retentions according to the number of cycles of the batteries prepared by using the positive electrode active materials of Example 2 and Comparative Example 2 is illustrated in FIG. 2.

TABLE 2

| Category | Capacity retention after 100 cycles (%) | Resistance increase rate after 100 cycles (%) |
|---|---|---|
| Example 1 | 93.91 | 5.37 |
| Example 2 | 97 | 3.52 |
| Comparative Example 1 | 91.58 | 14.75 |
| Comparative Example 2 | 95.4 | 4.91 |

As illustrated in Table 2, FIG. 1, and FIG. 2, in a case in which the positive electrode active materials of Examples 1 and 2 prepared according to the method of the present invention were used, it may be confirmed that high-temperature capacity retentions were higher and resistance increase rates were lower than those of the positive electrode active materials of Comparative Examples 1 and 2 prepared according to a conventional method.

The invention claimed is:

1. A method of preparing a positive electrode active material, comprising:
forming a pre-calcinated mixture by adding a reaction mixture including a lithium raw material and a nickel-manganese-cobalt precursor to a first crucible and performing a primary heat treatment at a temperature of 500° C. to 800° C.; and
after discharging the pre-calcinated mixture from the first crucible, adding the pre-calcinated mixture to a second crucible and performing a secondary heat treatment at a temperature of 700° C. to 1,000° C. to form a lithium nickel manganese cobalt-based positive electrode active material,
wherein a volume of the pre-calcinated mixture formed after the primary heat treatment is 20% to 50% of a volume of the reaction mixture added to the first crucible prior to the primary heat treatment, and
wherein an amount of the pre-calcinated mixture added to the second crucible is 2 to 10 times an amount of the pre-calcinated mixture formed in the first crucible.

2. The method of claim 1, wherein the lithium raw material comprises at least one of a lithium hydroxide or a lithium carbonate.

3. The method of claim 1, wherein the nickel-manganese-cobalt precursor comprises at least one of a nickel manganese cobalt hydroxide, a nickel manganese cobalt oxyhydroxide, a nickel manganese cobalt carbonate, or a nickel manganese cobalt organic complex.

4. The method of claim 1, wherein the reaction mixture further comprises a doping raw material.

5. The method of claim 4, wherein the doping raw material comprises oxides, hydroxides, sulfides, oxyhydroxides, halides or a mixture thereof, which include at least one element selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo.

6. The method of claim 1, wherein the first crucible is a stainless steel crucible, a nickel crucible, or an alloy crucible.

7. The method of claim 1, wherein the primary heat treatment is performed for 1 hour or more.

8. The method of claim 1, wherein the second crucible is an aluminum crucible.

9. The method of claim 1, further comprising adding a doping raw material to the second crucible before the secondary heat treatment.

10. The method of claim 1, wherein the secondary heat treatment is performed for 2 hours or more.

11. The method of claim 1, wherein at least one of the primary heat treatment and the secondary heat treatment is performed in an air atmosphere.

12. The method of claim 1, further comprising milling or classifying the pre-calcinated mixture before the pre-calcinated mixture is added to the second crucible.

13. The method of claim 1, wherein the lithium nickel manganese cobalt-based positive electrode active material is represented by Formula 1:

$$Li_{1+x}[Ni_aMn_bCo_cM^1_{1-a-b-c}]_{1-x}O_2 \qquad \text{[Formula 1]}$$

wherein, in Formula 1, $-0.2 \leq x \leq 0.2$, $0<a<1$, $0<b<1$, and $0<c<1$, and
$M^1$ comprises at least one selected from the group consisting of W, Cu, Fe, V, Cr, Ti, Zr, Zn, Al, In, Ta, Y, La, In, Sr, Ga, Sc, Gd, Sm, Ca, Ce, Nb, Mg, B, and Mo.

* * * * *